(12) United States Patent
Ashraf et al.

(10) Patent No.: US 10,567,130 B2
(45) Date of Patent: Feb. 18, 2020

(54) TIMING REQUIREMENT DEPENDENT SEARCH SPACE CONFIGURATION FOR MTC DEVICES OF DIFFERENT CATEGORIES

(71) Applicant: Telefonaktiebolaget LM Ericsson (publ), Stockholm (SE)

(72) Inventors: Shehzad Ali Ashraf, Aachen (DE); Robert Baldemair, Solna (SE); Jörg Huschke, Aachen (DE); Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/080,462

(22) PCT Filed: Feb. 29, 2016

(86) PCT No.: PCT/EP2016/054205
§ 371 (c)(1),
(2) Date: Aug. 28, 2018

(87) PCT Pub. No.: WO2017/148498
PCT Pub. Date: Sep. 8, 2017

(65) Prior Publication Data
US 2019/0068338 A1 Feb. 28, 2019

(51) Int. Cl.
*H04W 72/04* (2009.01)
*H04L 5/00* (2006.01)
*H04L 1/00* (2006.01)

(52) U.S. Cl.
CPC .......... *H04L 5/0023* (2013.01); *H04L 1/0038* (2013.01); *H04L 5/0053* (2013.01); *H04W 72/0406* (2013.01)

(58) Field of Classification Search
CPC combination set(s) only.
See application file for complete search history.

(56) References Cited

U.S. PATENT DOCUMENTS

2013/0163543 A1* 6/2013 Freda ................ H04W 72/0406
370/329
2017/0290008 A1* 10/2017 Tooher .................. H04L 1/0007

OTHER PUBLICATIONS

Samsung, "Discussion on Downlink Control Channel", 3GPP TSG RAN WG1 Meeting #83, Anaheim, US, 201-11-15, pp. 1-2, R1-156806, 3GPP.

(Continued)

*Primary Examiner* — Shailendra Kumar
*Assistant Examiner* — Fahmida S Chowdhury
(74) *Attorney, Agent, or Firm* — Sage Patent Group

(57) ABSTRACT

An access node of the wireless communication network determines a configuration of a first search space (210) in terms of first time domain coordinates and first frequency domain coordinates of a time-frequency grid of radio resource elements. Further, the access node determines a configuration of a second search space (220) in terms of second time coordinates and second frequency domain coordinates of the time-frequency grid. The second search space (220) differs from the first search space at least with respect to the time domain coordinates. In radio resource elements of the first search space (210), the access node transmits downlink control information for a first class of radio devices subject to a first timing requirement. In radio resource elements of the second search space (220), the access node transmits downlink control information for a second class of radio devices subject to a second timing requirement which is stricter than the first timing requirement.

18 Claims, 10 Drawing Sheets

(56) References Cited

OTHER PUBLICATIONS

Huawei, et al., "NB-IOT—downlink physical layer concept description", 3GPP TSG RAN WG1 Meeting #83, Anaheim, US, 201-11-15, pp. 1-11, R1-156462, 3GPP.
3rd Generation Partnership Project, "3rd Generation Partnership Project; Technical Specification Group Radio Access Network; Evolved Universal Terrestrial Radio Access (E-UTRA); Physical channels and modulation (Release 13)", Technical Specification, 3GPP TS 36.211 V13.0.0, Dec. 1, 2015, pp. 1-141, 3GPP, France.
3rd Generation Partnership Project, "3rd Generation Partnership Project; Technical Specification Group Radio Access Network; Evolved Universal Terrestrial Radio Access (E-UTRA); Physical layer procedures (Release 13)", Technical Specification, 3GPP TS 36.213 V13.0.0, Dec. 1, 2015, pp. 1-326, 3GPP, France.
3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 13)", Technical Specification, 3GPP TS 36.331 V13.0.0, Dec. 1, 2015, pp. 1-507, 3GPP, France.

* cited by examiner

TIMING REQUIREMENT DEPENDENT SEARCH SPACE CONFIGURATION FOR MTC DEVICES OF DIFFERENT CATEGORIES

TECHNICAL FIELD

The present invention relates to methods for controlling radio transmission in a wireless communication network and to corresponding devices.

BACKGROUND

In wireless communication networks, e.g., based on radio technologies as specified by 3GPP ($3^{rd}$ Generation Partnership Project), various kinds of control information are used for controlling radio transmission. In the LTE (Long Term Evolution) radio technology, Downlink control information (DCI) is transmitted on a PDCCH (Physical Downlink Control Channel) or EPDCCH (Enhanced Physical Downlink Control Channel) established between the wireless communication network and a UE (user equipment), as for example specified in 3GPP TS 36.211 V13.0.0 (2015-12). The DCI may for example be used to provide an uplink scheduling grant (UL SG) and/or a downlink scheduling assignment (DL SA) to the UE. The UL SG indicates radio resources which are assigned to the UE for a radio transmission in an uplink (UL) direction from the UE to the wireless communication network. The DL SA indicates radio resources which are assigned to the UE for a radio transmission in a downlink (DL) direction from the wireless communication network to the UE. In the time domain, the radio transmissions are organized in radio frames composed of multiple subframes, and the PDCCH is transmitted in a control region typically located in the first (one, two or three) OFDM (Orthogonal Frequency Division Multiplexing) symbols of each subframe. As defined in 3GPP TS 26.213 (2015-12), the DCI for a certain UE can be transmitted in a UE specific search space, using one of several possible DCI formats. Since UE does not know which resource elements in the search space were used for transmitting the DCI and which DCI format was used, the UE performs blind decoding over the search space until correctly receiving the DCI. In the case of the PDCCH, the UE specific search space is derived by the UE from its identity and a subframe number. For the EPDCCH, UE specific search spaces may be signalled in an RRC (Radio Resource Control) message to the UE, using the "EPDCCH-Config" information element as for example defined in 3GPP TS 36.331 V13.0.0 (2015-12). The UE specific search spaces extend over the same time domain range, in the case of the PDCCH over the entire control region of the subframe, and in the case of the EPDCCH over the data region of the subframe, i.e., the part of the subframe which is not assigned as control region.

With further evolution of wireless communication systems, there is an increasing demand of efficiently supporting various kinds of application scenarios. One example of such application scenarios is reliable ultra-low delay machine-type communication (MTC), also referred to as Critical-MTC or C-MTC. For C-MTC, it is desirable to specifically support sporadic latency transmissions of data with low latency and to manage coexistence of such latency critical transmissions with non-critical transmissions of data, e.g., best-effort traffic. While this issue may be addressed by prioritizing the latency critical transmissions over the non-critical transmissions, there is still a risk that the blind decoding process for receiving the required DCI, e.g., a DL SA or UL SG, causes excessive delay.

Accordingly, there is a need for techniques which allow for efficiently controlling radio transmissions in scenarios where UEs are subject to specific timing requirements, such as low latency.

SUMMARY

According to an embodiment of the invention, a method of controlling radio transmission in a wireless communication network is provided. According to the method an access node of the wireless communication network determines a configuration of a first search space in terms of first time domain coordinates and first frequency domain coordinates of a time-frequency grid of radio resource elements. Further, the access node determines a configuration of a second search space in terms of second time coordinates and second frequency domain coordinates of the time-frequency grid. The second search space differs from the first search space at least with respect to the time domain coordinates. In radio resource elements of the first search space, the access node transmits downlink control information for a first class of radio devices subject to a first timing requirement. In radio resource elements of the second search space, the access node transmits downlink control information for a second class of radio devices subject to a second timing requirement which is stricter than the first timing requirement.

According to a further embodiment of the invention, a method of controlling radio transmission in a wireless communication network is provided. According to the method, a radio device selects at least one of a first search space configuration and a second search space configuration. This selecting is performed depending on a timing requirement for the radio device. The first search space configuration defines a first search space in terms of first time domain coordinates and first frequency domain coordinates of a time-frequency grid of radio resource elements. The second search space configuration defines a second search space in terms of second time coordinates and second frequency domain coordinates of the time-frequency grid. The second search space differs from the first search space at least with respect to the time domain coordinates. If the first search space configuration is selected, the radio device receives downlink control information in radio resource elements of the first search space. If the second search space configuration is selected, the radio device receives downlink control information in radio resource elements of the second search space.

According to a further embodiment of the invention, an access node for a wireless communication network is provided. The access node is configured to determine a configuration of a first search space in terms of first time domain coordinates and first frequency domain coordinates of a time-frequency grid of radio resource elements. Further, the access node is configured to determine a configuration of a second search space in terms of second time coordinates and second frequency domain coordinates of the time-frequency grid. The second search space differs from the first search space at least with respect to the time domain coordinates. Further, the access node is configured to transmit, in radio resource elements of the first search space, downlink control information for a first class of radio devices subject to a first timing requirement. Further, the access node is configured to transmit, in radio resource elements of the second search space, downlink control information for a second class of radio devices subject to a second timing requirement which is stricter than the first timing requirement.

According to a further embodiment of the invention, a radio device for a wireless communication network is provided. The radio device is configured to, depending on a timing requirement for the radio device, select at least one of a first search space configuration and a second search space configuration. The first search space configuration defines a first search space in terms of first time domain coordinates and first frequency domain coordinates of a time-frequency grid of radio resource elements. The second search space configuration defines a second search space in terms of second time coordinates and second frequency domain coordinates of the time-frequency grid. The second search space differs from the first search space at least with respect to the time domain coordinates. Further, the radio device is configured to, if the first search space configuration is selected, receive downlink control information in radio resource elements of the first search space. Further, the radio device is configured to, if the second search space configuration is selected, receive downlink control information in radio resource elements of the second search space.

According to a further embodiment of the invention, a computer program or computer program product is provided, e.g., in the form of a non-transitory storage medium, which comprises program code to be executed by at least one processor of an access node of a wireless communication network. Execution of the program code causes the access node to determine a configuration of a first search space in terms of first time domain coordinates and first frequency domain coordinates of a time-frequency grid of radio resource elements. Further, execution of the program code causes the access node to determine a configuration of a second search space in terms of second time coordinates and second frequency domain coordinates of the time-frequency grid. The second search space differs from the first search space at least with respect to the time domain coordinates. Further, execution of the program code causes the access node to transmit, in radio resource elements of the first search space, downlink control information for a first class of radio devices subject to a first timing requirement. Further, execution of the program code causes the access node to transmit, in radio resource elements of the second search space, downlink control information for a second class of radio devices subject to a second timing requirement which is stricter than the first timing requirement.

According to a further embodiment of the invention, a computer program or computer program product is provided, e.g., in the form of a non-transitory storage medium, which comprises program code to be executed by at least one processor of a radio device for a wireless communication network. Execution of the program code causes the radio device to, depending on a timing requirement for the radio device, select at least one of a first search space configuration and a second search space configuration. The first search space configuration defines a first search space in terms of first time domain coordinates and first frequency domain coordinates of a time-frequency grid of radio resource elements. The second search space configuration defines a second search space in terms of second time coordinates and second frequency domain coordinates of the time-frequency grid. The second search space differs from the first search space at least with respect to the time domain coordinates. Further, execution of the program code causes the radio device to, if the first search space configuration is selected, receive downlink control information in radio resource elements of the first search space. Further, execution of the program code causes the radio device to, if the second search space configuration is selected, receive downlink control information in radio resource elements of the second search space.

Details of such embodiments and further embodiments will be apparent from the following detailed description of embodiments.

DETAILED DESCRIPTION OF EMBODIMENTS

Figure 1:
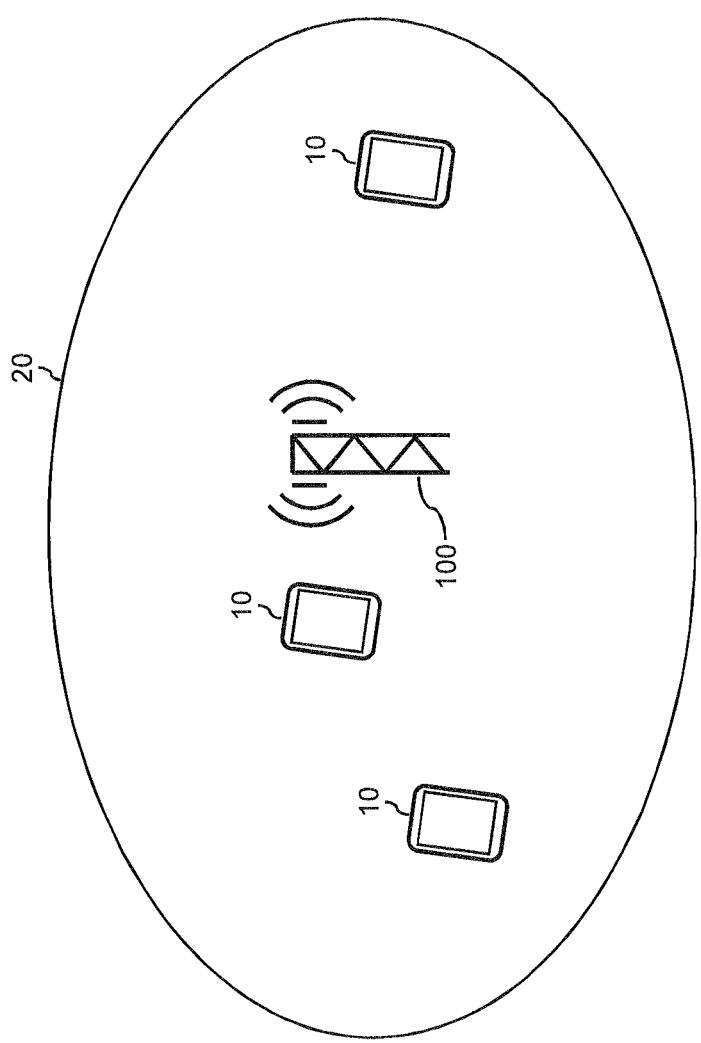
FIG. 1 schematically illustrates a wireless communication system according to an embodiment of the invention.

In the following, concepts in accordance with exemplary embodiments of the invention will be explained in more detail and with reference to the accompanying drawings. The illustrated embodiments relate to control of radio transmission in a wireless communication network, specifically to providing control information to radio devices, e.g., UEs. The wireless communication network may be organized as a cellular network and comprise multiple access nodes serving corresponding coverage regions, which may also be referred to as "cells". In the following examples, it will be assumed that the wireless communication network is based on the LTE radio technology. In this case, the access nodes may correspond to eNBs (eNB: "evolved Node B") of the LTE radio technology. However, it is to be understood that the illustrated concepts may also be applied to other radio technologies, e.g., a 5G ($5^{th}$ Generation) radio access technology.

In the illustrated concepts, the radio transmissions are assumed to be performed on radio resources organized in a time-frequency grid. The time-frequency grid defines resource elements which are each identified by a corresponding time coordinate and frequency coordinate. The frequency coordinates may correspond to different carrier frequencies arranged according to a predefined frequency raster, and the time coordinates me correspond to timeslots arranged according to a predefined time raster. The radio transmissions may for example be based on OFDM, the carrier frequencies may correspond to OFDM subcarriers, and the timeslots may correspond to OFDM symbols.

A part of the resource elements of the time-frequency grid is assumed to be used for transmission of downlink control information to the radio devices. This part of the time-frequency grid may also be referred to as "control region". The transmission of the control information is based on a blind decoding process performed by the radio device in a certain search space within the control region. The blind decoding process involves that the radio device repeatedly attempts to decode downlink control information from signals received on the resource elements of the search space until the downlink control information is successfully decoded, without previous knowledge on which resource elements of the search space the downlink control information is actually transmitted.

In order to efficiently support different timing requirements which may exist with respect to the radio devices, the search spaces for transmission of the downlink control information are provided with different configurations, each adapted to suit a corresponding timing requirement. For example, some radio devices may be subject to a strict timing requirement, e.g., requiring that a latency of the radio transmissions is below a certain threshold, while other radio devices may be subject to a less strict timing requirement, e.g., tolerating higher latencies. For the radio devices subject to the less strict timing requirement, a first search space can be configured, while for the radio devices subject to the stricter timing requirement a second search space is configured. The second search space may then be tailored to specifically address the strict timing requirement, by configuring the second search space to defer at least with respect to its time coordinates from the first search space. By way of example, the second search space may be configured to start earlier in time than the first search space. In this way, it can be achieved that blind decoding for the second search space can begin earlier, and latency thus be reduced. As a further example, the second search space may be configured to extend over a shorter time period than the first search space. This in turn may ensure that blind decoding for the second search space finishes within a shorter time period, thereby reducing latency. As a further example, the second search space may be configured to occur more frequently than the first search space, thereby reducing a waiting time before blind decoding can begin and thus reducing latency. On the other hand, by also providing the first search space for the radio devices subject to the less strict timing requirement, efficient utilization of radio resources can be achieved, because the first search space may also utilize configurations involving a higher risk of causing latency and thus cover other resource elements than the first search space.

It is noted that in some cases the same radio device may also utilize both search spaces. For example, the radio device could be configured with a first application subject to the stricter timing requirement, e.g., an application which generates alert messages of high priority, and at the same time be configured with a second application subject to the less strict timing requirement, e.g., an application which generates best-effort traffic. In these cases, downlink control information may be differentiated depending on the utilized application and the transmitted in the search space corresponding to the respective timing requirement.

FIG. 1 shows an exemplary scenario in which the concepts as outlined above may be applied. Specifically, FIG. 1 illustrates a number of radio devices 10 and an access node 100. As mentioned above, the radio devices 10 may correspond to UEs, and the access node 100 may correspond to a base station, such as an eNB of the LTE radio technology. As illustrated, the radio devices 10 are located in a coverage region 20 served by the access node 100. As mentioned above, such coverage region may also be referred to as a "cell". It is noted that the wireless communication network may actually provide a plurality of access node, each serving a corresponding coverage region, and that the radio devices may move between these different coverage regions and thus connect to the wireless communication network via different access nodes.

For controlling radio transmissions to or from the radio devices 10, the access node 100 provides downlink control information to the radio devices 10, e.g., on a control channel, such as a PDCCH of the LTE radio technology. The downlink control information may have the purpose of controlling downlink (DL) radio transmissions in a DL direction from the wireless communication network to the radio device 10 and/or for controlling uplink (UL) radio transmissions from the radio device 10 to the wireless communication network. The downlink control information may for example be used to provide an uplink scheduling grant (UL SG) and/or a downlink scheduling assignment (DL SA) to the UE. The UL SG indicates radio resources which are assigned to the radio device 10 for an UL radio transmission, and the DL SA indicates radio resources which are assigned to the radio device 10 for a DL radio transmission. Because typically the radio device 10 cannot send a UL radio transmission before having received a UL SG allocating radio resources to be used for the UL radio transmission and cannot receive a DL radio transmission before having received a DL SA allocating radio resources to be used for the DL radio transmission, any delay associated with the transmission of the downlink control information may contribute to latency experienced by the radio device 10. However, it is noted that similar facts on latency experienced by the radio device 10 May also exist for other kinds of downlink control information, e.g., downlink control information used for controlling transmit power or adaptation of modulation and coding.

Figure 2:
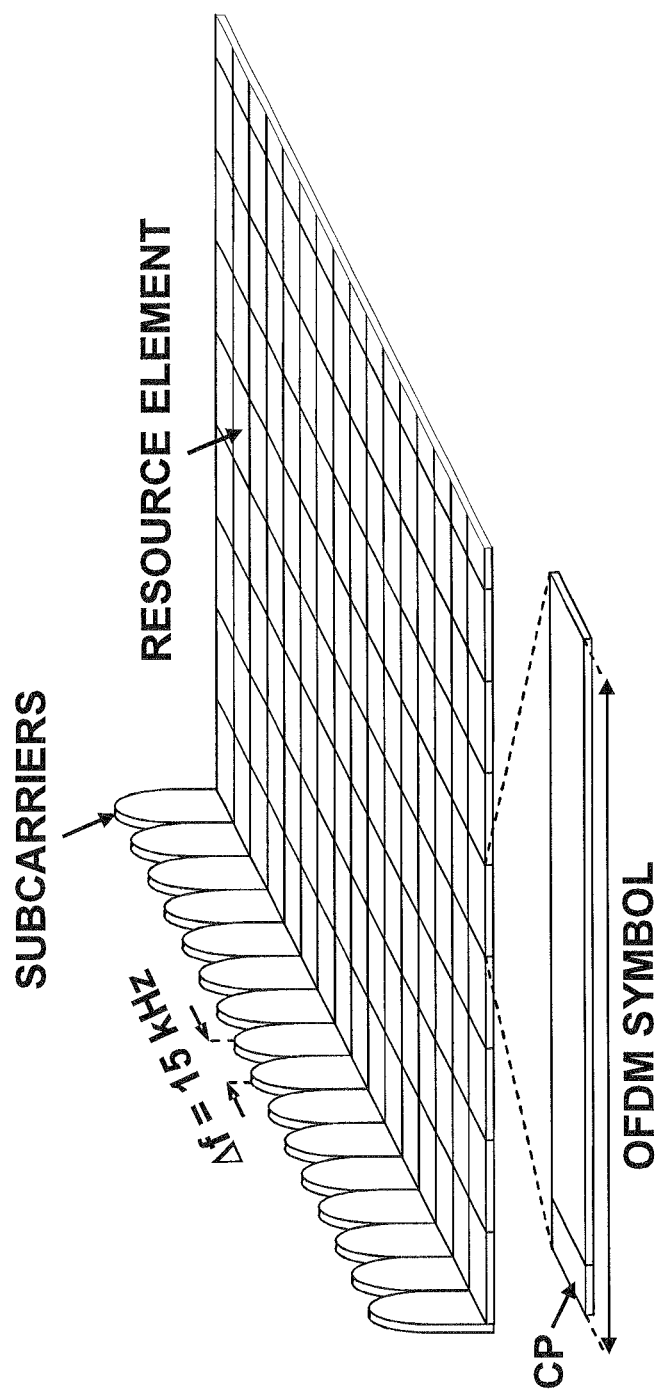
FIG. 2 shows an example of a time frequency grid of radio resource elements which may be utilized according to an embodiment of the invention.

FIG. 2 illustrates an example of how the time-frequency grid utilized for the radio transmissions may be organized. Specifically, FIG. 2 illustrates a configuration of the time-frequency grid as used in the LTE radio technology. In the example of FIG. 2, the time-frequency grid comprises a plurality of resource elements which correspond to one subcarrier of 15 kHz width in the frequency domain and a time slot having the duration of one OFDM symbol. As further illustrated, the OFDM symbols may each include a cyclic prefix (CP). In the time-domain, the radio transmissions in the mobile communication network may further be organized in a sequence of radio frames which each include a number of subframes. In the LTE radio technology, the duration of the radio frames is 10 ms, and the duration of a subframe is 1 ms, which means that the radio frames each consist of ten subframes. The downlink control information is assumed to be in a certain part of this time-frequency grid, which may be defined in each subframe. In particular, in each subframe search spaces in which the radio devices 10 perform a blind decoding process to receive the downlink control information. As mentioned above, these search spaces are defined depending on a timing requirement imposed for a certain radio device 10, a certain group for class of radio devices 10, or for certain applications configured on the radio devices 10. Examples how these search spaces may be configured to efficiently address different timing requirements which may coexist in the wireless communication network will be explained in the following.

Figure 3:
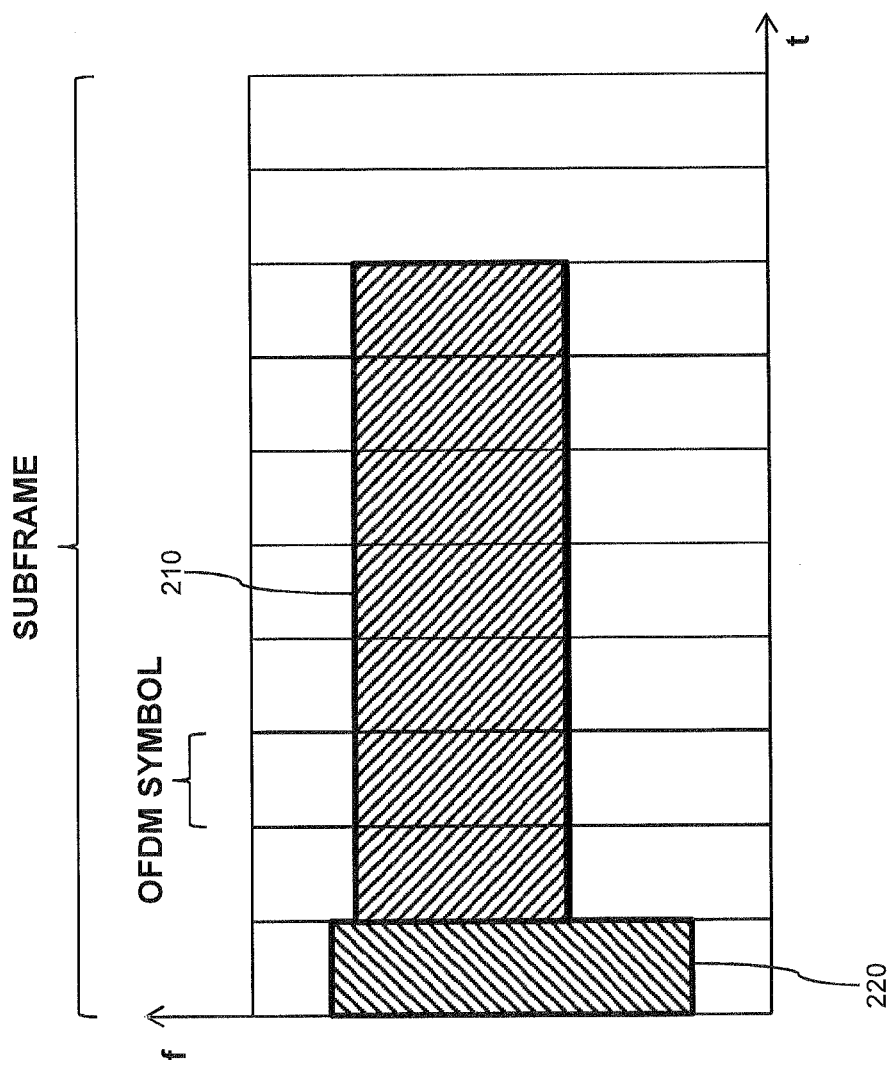
FIG. 3 schematically illustrates exemplary configurations of a first search space and a second search space according to an embodiment of the invention.

According to an example as illustrated in FIG. 3, a first search space 210 and a second search space 220 are defined within a subframe. The first search space 210 is utilized for transmitting the downlink control information to a first class of the radio devices 10, and the second search space 220 is utilized for transmitting the downlink control information to a second class of the radio devices 10. The second class of the radio devices 10 is assumed to be subject to a stricter timing requirement than the first class of the radio devices 10. In the example of FIG. 3, this issue is addressed by configuring the second search space 220 earlier within the subframe and with a shorter time duration. As further illustrated, the shorter time duration of the second search space 220 may be compensated by providing the second search space 220 with a larger frequency domain dimension than the first search space 210. In this way, the second search space may cover a sufficient amount of radio resources, even though it is confined with respect to its time domain dimension. In the example of FIG. 3, the second search space 220 is located within the first OFDM symbol of the subframe, thereby ensuring that the radio devices 10 subject to the strict timing requirement can receive their respective downlink control information with minimal delay in the first OFDM symbol of the subframe.

Figure 4:
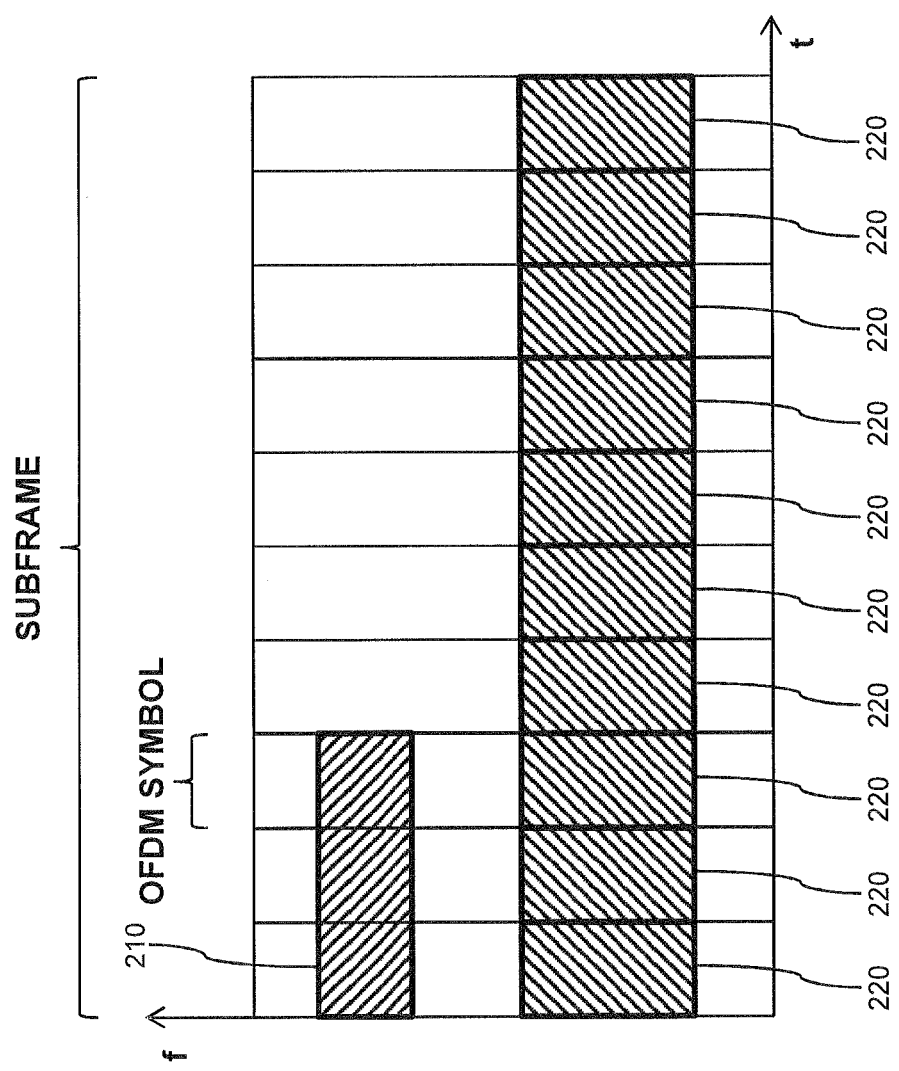
FIG. 4 schematically illustrates further exemplary configurations of a first search space and a second search space according to an embodiment of the invention.

According to a further example as illustrated in FIG. 4, the first search space 210 and the second search space 220 are configured with different time periodic patterns. Specifically, the first search space 210 is configured with a time periodic pattern defined by a first period, and the second search space 220 is configured with a time periodic pattern defined by a second period which is shorter than the first period. Accordingly, the second search space 220 occurs more frequently than the first search space 210, which allows for producing a delay contribution associated with a waiting time until the next occasion at which the downlink control information can be transmitted. In the example of FIG. 4, the first search space 210 occurs ones within the subframe, whereas the second search space 220 occurs more frequently, in particular within every OFDM symbol of the subframe. The more frequently occurring search space 220 allows for using a shortened TTI (Transmission Time Interval), i.e., a finer time granularity of radio transmissions, for the radio devices 10 which are subject to the strict timing requirement. In this way, it can be ensured that for the radio devices 10 subject to the strict timing requirement the delay contribution associated with the waiting time until the next occasion at which the downlink control information can be transmitted is minimized. It is noted that the example of FIG. 4 may be regarded as an extreme case of shortening the second search space 220 and that other examples of using different periodicities of the first search space 210 and the second search space 220 are possible as well and that the periodic patterns defining the search spaces 210, 220 do not need to be confined to one subframe. For example, the first search space 210 could occur once every second (or n-th with n≥2) subframe, and the second search space 220 could occur once every subframe or even multiple times within each subframe.

It is noted that the first search space 210 and the second search space 220 as illustrated in FIGS. 3 and 4 should be regarded as illustrative examples of how the search spaces may be confined so as to address different coexisting timing requirements. The illustrated search spaces 210, 220 could be used as a common search space for multiple radio devices 10 subject to the same timing requirement. However, the illustrated search spaces could also be used as a basis for defining UE-specific (or radio device specific) search spaces. In this case, the UE-specific search space for a given radio device 10 subject to the less strict timing requirement may correspond to a subset of the radio resources defined by the first search space 210, and the UE-specific search space for a given radio device 10 subject to the stricter timing requirement may correspond to a subset of the radio resources defined by the second search space 220.

In some scenarios, the first search space 210 and the second search space 220 may be adapted in a dynamic manner, e.g., based on traffic load. For example, if the access node 100 determines that the number the radio devices 10 which are subject to the strict timing requirement increases, the second search space 220 may be enlarged. At the same time, the size of the first search space 210 may be reduced. The adapted configurations of the search spaces 210, 220 may then be indicated to the radio devices 10, e.g., by RRC signalling or broadcasted system information.

The timing requirement which is applicable for a certain radio device 10 may be determined depending on various criteria. For example, the timing requirement may depend on a type or category of the radio device, e.g., depending on whether the radio device 10 belongs to a C-MTC category. For example, if the radio device 10 belongs to the C-MTC category, it may be identified as being subject to the stricter timing requirement, and the second search space 220 may thus be used for transmitting the downlink control information to the radio device 10. Further, the radio devices 10 may be assigned to different priority classes, e.g., on the basis of a QoS (Quality of Service) mechanism. If a certain radio device 10 has a higher priority than another one of the radio devices 10, it may also be identified as being subject to the stricter timing requirement and the second search space 220 may thus be used for transmitting the downlink control information to the radio device 10, whereas the first search space 210 is used for transmitting the downlink control information to the other radio device 10.

In some scenarios, the timing requirement which is applicable for a certain radio device 10 may also be determined depending on the mobility status of the radio device 10. For example, a fast moving radio device 10 may be identified as being subject to a stricter timing requirement that a slow moving radio device. In this way, it can be taken into account that movement of the radio device may result in increased time criticality, e.g., because certain channel conditions or association of the radio device 10 with a certain access node is only valid for a limited time.

In some scenarios, the timing requirement which is applicable for a certain radio device 10 may also be determined depending on a battery lifetime of the radio device 10. For example, if the battery lifetime of the radio device 10 is below a threshold, it may be identified as being subject to the stricter timing requirement. In this way, the blind decoding process performed by the radio device 10 may be shortened, which in turn facilitates energy saving. For example, the shortened blind decoding process may allow for using extended sleep times of a DRX (discontinuous reception) cycle. The battery lifetime may be taken into account in a dynamic manner, e.g., based on reporting of remaining battery lifetime by the radio device 10 to the access node 100. Based on such reporting, the access node 100 may then determine which timing requirement is applicable for the radio device 10 and then correspondingly select either the first search space 210 or the second search space 220 for transmission of the downlink control information to the radio device 10. In such cases, the selection performed by the access node 100 may also be indicated to the radio device 10, e.g., using RRC signalling. In some scenarios, the battery lifetime may also be considered in a device-dependent manner, by generally treating radio devices 10 with lower battery lifetime as being subject to the stricter timing requirement.

It is noted that the above-mentioned criteria for determining a timing requirement applicable for radio devices and selecting a corresponding search space may also be used in various combinations.

In some scenarios, the selection of different search space configurations, e.g., selecting the first search space 210 or the second search space 220, may also be associated with different allocations of resource elements of the time-frequency grid to reference signal (RS) transmission. That is to say, a certain search space configuration may not only define the resource elements of the time frequency grid which may be used for the transmission of the downlink control information and thus should be covered by the blind decoding process, but may also define which resource elements of the time frequency grid are assigned to RS transmission. Accordingly, if the first search space 210 is used for a certain radio device 10, other resource elements of the time-frequency grid may be assigned for RS transmission than in the case that the second search space 220 is used. For example, in the case of the first search space 210, which extends over the longer time domain dimension, resource elements may be assigned for RS transmission also later in the search space. For example, in the case of the first search space 210, which extends over a longer time dimension, resource elements at the end of the search space 210, e.g., in the last OFDM symbol, could be assigned to RS transmission (in addition to or instead of assigning resource elements at the start of the search space 210). This may for example allow for improved assessment of channel conditions in the case of a fast moving radio device 10. Also the resource elements assigned for RS transmission may be indicated to the radio device 10 by RRC signaling. In some cases, the radio device 10 may also derive the resource elements assigned for RS transmission from the selected search space 210, 220.

As mentioned above, it is also possible that the same radio device 10 utilizes both the first search space 210 and the second search space 220. For example, this radio device 10 could be configured with different types of applications, e.g., a first type of application subject to the strict timing requirement and a second type of application subject to the less strict timing requirement. In this case, downlink control information related to the first type of application could be transmitted in resource elements of the first search space, whereas downlink control information related to the second type of application could be transmitted in the resource elements of the second search space.

It is noted that although the above examples assume to different search spaces 210, 220, the illustrated examples could also be extended to larger numbers of different search spaces, e.g., in order to take into account a strict timing requirement, a relaxed timing requirement, and one or more intermediate timing requirements.

In each of the above-mentioned scenarios, the search space 210, 220 to be utilized by the radio device 10 and/or the configuration of this search space 210, 220, e.g., in terms of its position or extension in the time domain and/or frequency domain, may be signalled to the radio device 10, e.g., using RRC signalling or broadcasted system information. This can be accomplished individually for each radio device 10 or jointly for a group of class of radio devices 10. In some cases, the selection of the search space 210, 220 to be utilized by the radio device 10 may also be based on an algorithm implemented by the radio device, e.g., based on selection criteria as mentioned above or information explicitly or implicitly signalled to the radio device 10. For example, such algorithm could perform the selection based on an identity of the radio device 10, e.g., an RNTI (Radio Network Temporary Identity), a QoS or delay class the radio device 10 is assigned to, or a number or size of available different search spaces 210, 220.

For a given radio device 10, a process of configuring the search space for transmission of the downlink control information may thus work as follows: initially, the access node 100 may determine whether the radio device 10 is subject to a strict timing requirement. This may be accomplished depending on a device type of the radio device 10 and/or depending on applications configured on the radio device 10. Also capabilities of the radio device 10 or further characteristics, such as battery lifetime or status, may be taking into account when determining whether the radio device 10 is subject to the strict timing requirement. If an application subject to the strict timing requirement is configured on the radio device 10 or the radio device 10 per se is found to be subject to the strict timing requirement (e.g., due to its device category), the search space for this radio device 10 is configured to address the strict timing requirement. In particular, the search space may be configured as explained above for the second search space 220 to have a shorter time duration, and earlier position within the subframe, and/or a higher frequency of occurrence than a search space utilized for transmission of downlink control information to radio devices 10 subject to a less strict timing requirement, such as the above-mentioned first search space 210. In an extreme case, the search space configured to address the strict timing requirement may have a time domain dimension of only one OFDM symbol and/or may be located in the first OFDM symbol of a subframe. Further, the search space configured to address the strict timing requirement may occur multiple times within the same subframe, as for example explained in connection with FIG. 4.

Figure 5:
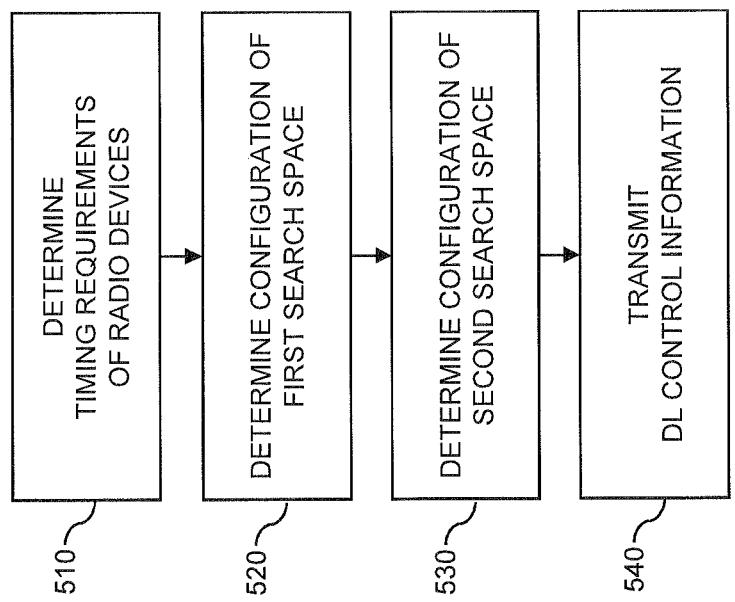
FIG. 5 shows a flowchart for schematically illustrating a method according to an embodiment of the invention.

FIG. 5 shows a flowchart for illustrating a method of controlling radio transmissions in a wireless communication network. The method of FIG. 5 may be utilized for implementing the illustrated concepts in an access node of the wireless communication network, e.g., the access node 100. If a processor-based implementation of the access node is used, the steps of the method may be performed by one or more processors of the access node. In such a case the access node may further comprise a memory in which program code for implementing the below described functionalities is stored.

At step 510, the access node may determine timing requirements of radio devices within a coverage region of the access node. For example, such timing requirement may be defined in terms of maximum allowed delay or latency. The timing requirement may also be derived from characteristics or capabilities of the radio device, such as configured QoS parameters, device category, mobility status, current battery status, battery lifetime, or the like. Also utilization of DRX by the radio could be seen as an indication that the radio device is subject to a stricter timing requirement. The timing requirement for a radio device may also be determined by classification, such as "timing critical" and "not timing critical", and optionally one or more intermediate classes. In some cases, the access node may determine the timing requirement based on information reported by the radio devices, such as reports of battery status, reports of device capabilities, or reports of utilized applications.

The determination of step 510 may also involve identifying radio devices subject to different timing requirements, e.g., radio devices subject to a first timing requirement and radio devices subject to a second timing requirement which is stricter than the first timing requirement. In some scenarios, the access node may also determine a number of radio devices of the first class in the coverage region of the access node and/or a number of radio devices of the second class in the coverage region of the access node. This may allow for assessing an expected traffic load associated with the different classes.

At step 520, the access node determines a configuration of a first search space. The configuration of the first search space is determined in terms of first time domain coordinates and first frequency domain coordinates of a time-frequency grid of radio resource elements. For example, this may involve defining a frequency domain position and/or time domain position of the first search space. Further, this may involve defining a frequency domain extension and/or a time domain extension of the first search space.

At step 530, the access node determines a configuration of a second search space. The configuration of the second search space is determined in terms of second time coordinates and second frequency domain coordinates of the time-frequency grid. For example, this may involve defining a frequency domain position and/or time domain position of the second search space. Further, this may involve defining a frequency domain extension and/or a time domain extension of the second search space. The second search space differs from the first search space at least with respect to the time domain coordinates.

In some scenarios, the second search space has a shorter time duration than the first search space. As for example illustrated in FIG. 3, in order to minimize latency for the second class of radio devices, the second search space may be configured with a time duration of one OFDM symbol. In addition or as an alternative, the second search space may have an earlier start time than the first search space. As for example illustrated in FIG. 3, the second search space could start with the first OFDM symbol of a subframe, and the first search space could start with a later OFDM symbol of the subframe. Further, the second search space may extend over a larger frequency range than the first search space. In this way, a reduced time domain extension of the second search space may be compensated for.

In some scenarios, the first search space may be configured according to a periodic pattern defined by a first time period, and the second search space may be configured according to a periodic pattern defined by a second time period which is shorter than the first time period. As for example illustrated in FIG. 4, the first search space could be configured to occur once every subframe, whereas the second search space could be configured to occur on multiple occasions within the subframe, e.g., in every OFDM symbol.

The access node may determine the configuration of at least one of the first search space and the second search space depending on the number of radio devices of the first class, as optionally determined at step 510. Further, the access node may determine the configuration of at least one of the first search space and the second search space depending on the number of radio devices of the second class, as optionally determined at step 510. As mentioned above, these numbers may serve as an indication of an expected traffic load associated with the different classes, and the search spaces may be adapted according to the associated need for transmission of downlink control information. In this way, can in particular be ensured that there is sufficient capacity for transmission of the downlink control information to the radio devices subject to the stricter timing requirement.

In some scenarios, the access node may also otherwise determine a traffic load associated with radio devices of the first class in a coverage region of the access node, e.g., based on monitoring the data traffic, and then determine the configuration of at least one of the first search space and the second search space depending on the determined traffic load associated with the radio devices of the first class. Similarly, the access node may also otherwise determine a traffic load associated with radio devices of the second class in a coverage region, e.g., based on monitoring the data traffic, and then determine the configuration of at least one of the first search space and the second search space depending on the determined traffic load associated with the radio devices of the second class. Accordingly, the access node may dynamically adapt the configuration of the search spaces to the situation within the coverage region of the access node.

The access node may indicate at least one of the determined configuration of the first search space and the determined configuration of the second search space to one or more radio devices in a coverage region of the access node. This may for example be accomplished by RRC signalling and/or by broadcasted system information.

At step 540, the access node transmits downlink control information to the radio devices. Specifically, in radio resource elements of the first search space, the access node transmits downlink control information for a first class of radio devices subject to a first timing requirement, and in radio resource elements of the second search space, the access node transmits downlink control information for a second class of radio devices subject to a second timing requirement which is stricter than the first timing requirement. Radio devices belonging to these different classes may have been identified at step 510.

In some scenarios, the determined configuration of the first search space may define a first set of radio resource elements of the time-frequency grid which are assigned to transmission of reference signals, and the determined configuration of the second search space may define a second set of radio resource elements of the time-frequency grid which are assigned to transmission of reference signals. The second set of radio resource elements may then be different from the first set of resource elements with respect to at least one of the resource elements assigned to transmission of reference signals. In this way, different reference signal configurations may be applied for different search space configurations. For example, in the case of configuring the first search space with a longer time duration, multiple resource elements assigned to the transmission of reference signals could be distributed in time over the duration of the search space, e.g., with the purpose of improving assessment of time-dependent variations of channel conditions.

Figure 6:
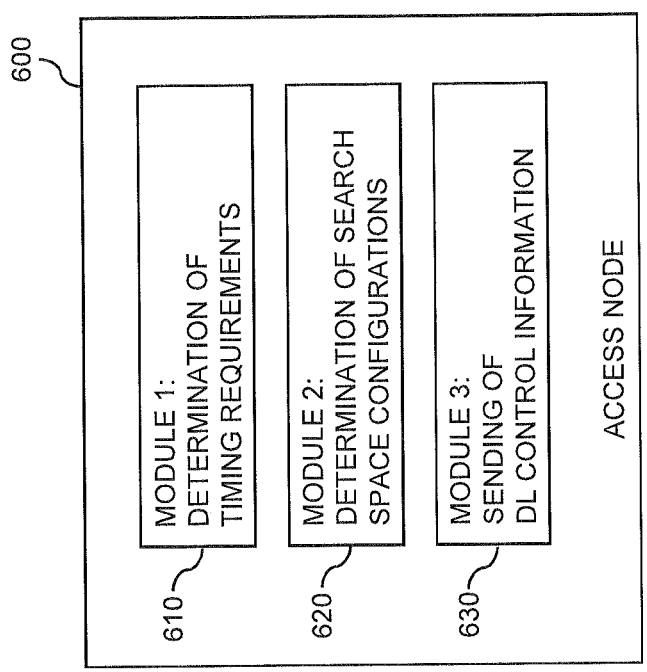
FIG. 6 shows a block diagram for illustrating functionalities of an access node according to an embodiment of the invention.

FIG. 6 shows a block diagram for illustrating functionalities of an access node 600 which operates according to the method of FIG. 5. As illustrated, the access node 600 may optionally be provided with a module 610 configured to determine timing requirements of radio devices, such as explained in connection with step 510. Further, the access node 600 may be provided with a module 620 configured to determine a configurations of search spaces, such as explained in connection with steps 520 and 530. Further, the access node 600 may be provided with a module 630 configured to send downlink the downlink control information, such as explained in connection with step 540.

It should be understood that the access node 600 may also include further modules for implementing other functionalities, such as functionalities for controlling connections to radio devices or for controlling transfer of data on such connections, and that the modules of the access node 600 do not necessarily represent a hardware structure of the access node 600, but may also correspond to functional elements, e.g., implemented by hardware, software, or a combination thereof.

Figure 7:
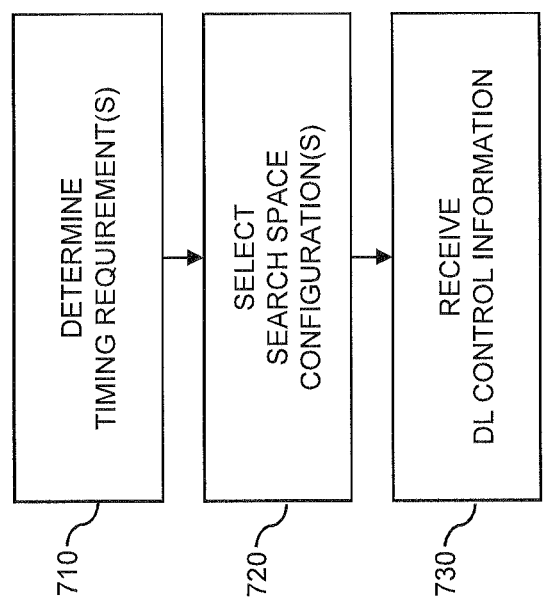
FIG. 7 shows a flowchart for schematically illustrating a further method according to an embodiment of the invention.

FIG. 7 shows a flowchart for illustrating a further method of controlling radio transmissions in a wireless communication network. The method of FIG. 7 may be utilized for implementing the illustrated concepts in a radio device, e.g., one of the radio devices 10. If a processor-based implementation of the radio device is used, the steps of the method may be performed by one or more processors of the radio device. In such a case the radio device may further comprise a memory in which program code for implementing the below described functionalities is stored.

At step 710, the radio device may determine at least one timing requirement applicable for the radio device or one or more applications configured on the radio device. For example, such timing requirement may be defined in terms of maximum allowed delay or latency. The timing requirement may also be derived from characteristics or capabilities of the radio device, such as configured QoS parameters, device category, mobility status, current battery status, battery lifetime, or the like. Also utilization of DRX by the radio could be seen as an indication that the radio device is subject to a stricter timing requirement. The timing requirement for the radio device may also be determined by classification, such as "timing critical" and "not timing critical", and optionally one or more intermediate classes. In some cases, the radio device may also report information enabling determination of the timing requirement to an access node of the wireless communication network. For example, the radio device may send reports of battery status, reports of device capabilities, or reports of utilized applications.

At step 720, the radio device selects at least one of a first search space configuration and a second search space configuration. This accomplished depending on a timing requirement for the radio device, e.g., as determined at step 710. In some cases, the radio device may also select both the first search space configuration and the second search space configuration. The radio device may performs the selection of step 720 based on an algorithm configured in the radio device. Alternatively or in addition, the radio device may perform the selection of step 720 based on received control information, e.g., via RRC signalling. Alternatively or in addition, the radio device may also perform the selection of step 720 based on information preconfigured in the radio device, e.g., by a manufacturer of the radio device and/or by an operator of the wireless communication network.

In some scenarios, the radio device may perform the selection of step 720 depending on applications configured on the radio device. Specifically, depending on a first timing requirement for a first application configured on the radio device, the radio device may select the first search space configuration. Similarly, depending on a second timing requirement for a second application configured on the radio device, the radio device may select the second search space configuration. Accordingly, if the radio device is configured with different applications subject to different timing requirements, a corresponding search space configuration may be selected for each of these different applications.

The first search space configuration defines a first search space in terms of first time domain coordinates and first frequency domain coordinates of a time-frequency grid of radio resource elements. For example, the first search space may be defined to be located at a certain frequency domain position and/or time domain position. Further, the first search space may be defined to have a certain frequency domain extension and/or time domain extension. The second search space configuration defines a second search space in terms of second time coordinates and second frequency domain coordinates of the time-frequency grid. For example, the second search space may be defined to be located at a certain frequency domain position and/or time domain position. Further, the second search space may be defined to have a certain frequency domain extension and/or time domain extension. The second search space differs from the first search space at least with respect to the time domain coordinates.

In some scenarios, the second search space has a shorter time duration than the first search space. As for example illustrated in FIG. 3, in order to minimize latency for the second class of radio devices, the second search space may be configured with a time duration of one OFDM symbol. In addition or as an alternative, the second search space may have an earlier start time than the first search space. As for example illustrated in FIG. 3, the second search space could start with the first OFDM symbol of a subframe, and the second search space could start with a later OFDM symbol of the subframe. Further, the second search space may extend over a larger frequency range than the first search space. In this way, a reduced time domain extension of the second search space may be compensated for.

In some scenarios, the first search space may be configured according to a periodic pattern defined by a first time period, and the second search space may be configured according to a periodic pattern defined by a second time period which is shorter than the first time period. As for example illustrated in FIG. 4, the first search space could be configured to occur once every subframe, whereas the second search space could be configured to occur on multiple occasions within the subframe, e.g., in every OFDM symbol.

The radio device may receive an indication of at least one of the first search space configuration and the second search space configuration from the wireless communication network. This may for example be accomplished through RRC signalling and/or through broadcasted system information.

At step 730, the radio device receives downlink control information. Specifically, if the first search space configuration is selected, the radio device receives downlink control information in radio resource elements of the first search space. If the second search space configuration is selected, the radio device receives downlink control information in radio resource elements of the second search space. Receiving the downlink control information may involve performing a blind decoding process on the resource elements of the first and/or second search space.

In some scenarios, the first search space configuration may define a first set of radio resource elements of the time-frequency grid which are assigned to transmission of reference signals, and the second search space configuration may define a second set of radio resource elements of the time-frequency grid which are assigned to transmission of reference signals. The second set of radio resource elements may then be different from the first set of resource elements with respect to at least one of the resource elements assigned to transmission of reference signals. In this way, different reference signal configurations may be applied for different search space configurations. For example, in the case of configuring the first search space with a longer time duration, multiple resource elements assigned to the transmission of reference signals could be distributed in time over the duration of the search space, e.g., with the purpose of improving assessment of time-dependent variations of channel conditions.

Figure 8:
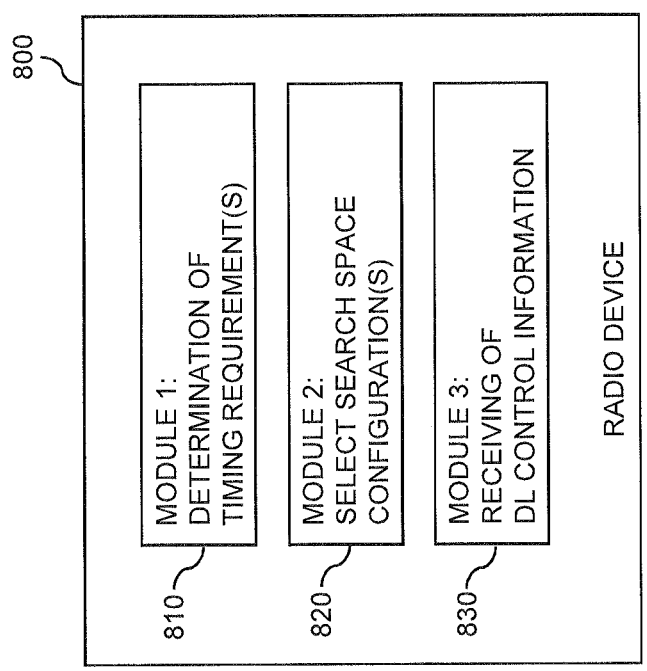
FIG. 8 shows a block diagram for illustrating functionalities of a radio device according to an embodiment of the invention.

FIG. 8 shows a block diagram for illustrating functionalities of a radio device 800 which operates according to the method of FIG. 7. As illustrated, the radio device 800 may optionally be provided with a module 810 configured to determine one or more timing requirements of the radio device, such as explained in connection with step 710. Further, the radio device 800 may be provided with a module 820 configured to select search space configurations, such as explained in connection with step 720. Further, the radio device 800 may be provided with a module 830 configured to receive downlink the downlink control information, such as explained in connection with step 730.

It should be understood that the radio device 800 may also include further modules for implementing other functionalities, such as functionalities for controlling connections to the wireless communication network or for controlling transfer of data on such connections, and that the modules of the radio device 800 do not necessarily represent a hardware structure of the radio device 800, but may also correspond to functional elements, e.g., implemented by hardware, software, or a combination thereof.

It is to be understood that the methods of FIGS. 5 and 7 may also be combined in a system which includes one or more access nodes operating according to the method of FIG. 5 and one or more radio devices operating according to the method of FIG. 7.

Figure 9:
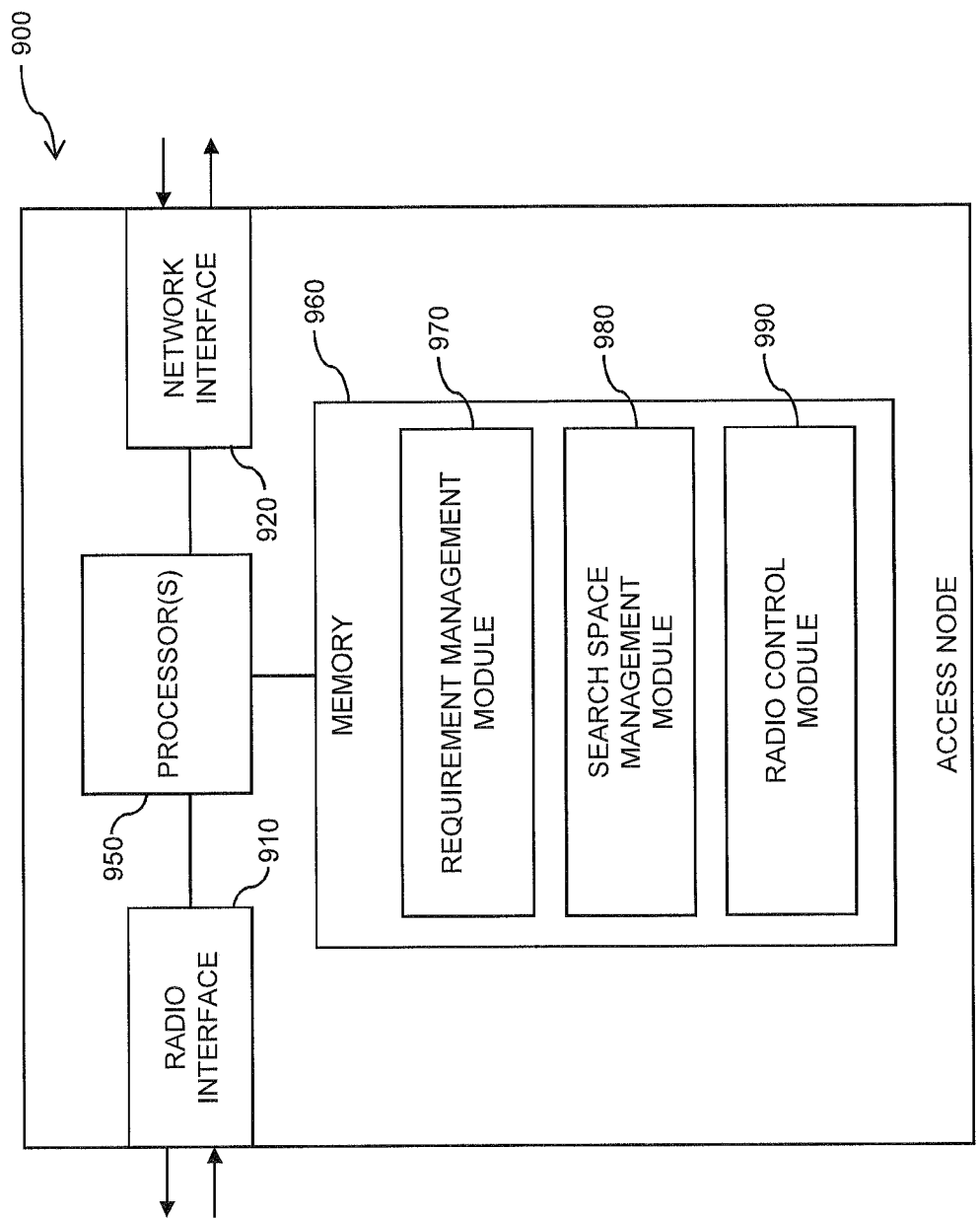
FIG. 9 schematically illustrates structures of an access node according to an embodiment of the invention.

FIG. 9 illustrates exemplary structures which may be used for implementing the above concepts in an access node 900 of a wireless communication network, such as the access node 100. As illustrated, the access node 900 may include a radio interface 910 for sending radio transmissions to radio devices and/or receiving radio transmissions from radio devices. Such radio devices may for example correspond to the above-mentioned radio devices 10. Further, the access node 900 may include a network interface 920 for connecting to a core network part of the wireless communication network and/or to other access nodes of the wireless communication network.

Further, the access node 900 may include one or more processors 950 coupled to the interfaces 910, 920, and a memory 960 coupled to the processor(s) 950. The memory 960 may include a ROM, e.g., a flash ROM, a Random Access Memory (RAM), e.g., a Dynamic RAM (DRAM) or Static RAM (SRAM), a mass storage, e.g., a hard disk or solid state disk, or the like. The memory 960 includes suitably configured program code to be executed by the processor(s) 950 so as to implement the above-described functionalities of an access node. In particular, the memory 960 may include various program code modules for causing the access node 900 to perform processes as described above, e.g., corresponding to the method steps of FIG. 5.

As illustrated, the memory 960 may include a requirement management module 970 for implementing the above-described functionalities of determining timing requirements of radio devices, such as explained in connection with step 510 of FIG. 5. Further, the memory 960 may include a search space management module 980 for implementing the above-described functionalities of determining configuration of search spaces, such as explained in connection with steps 520 and 530 of FIG. 5. Further, the memory 960 may also include a radio control module 990 for implementing the above-described functionalities of sending the downlink control information, such as explained in connection with step 540 of FIG. 5.

Figure 10:
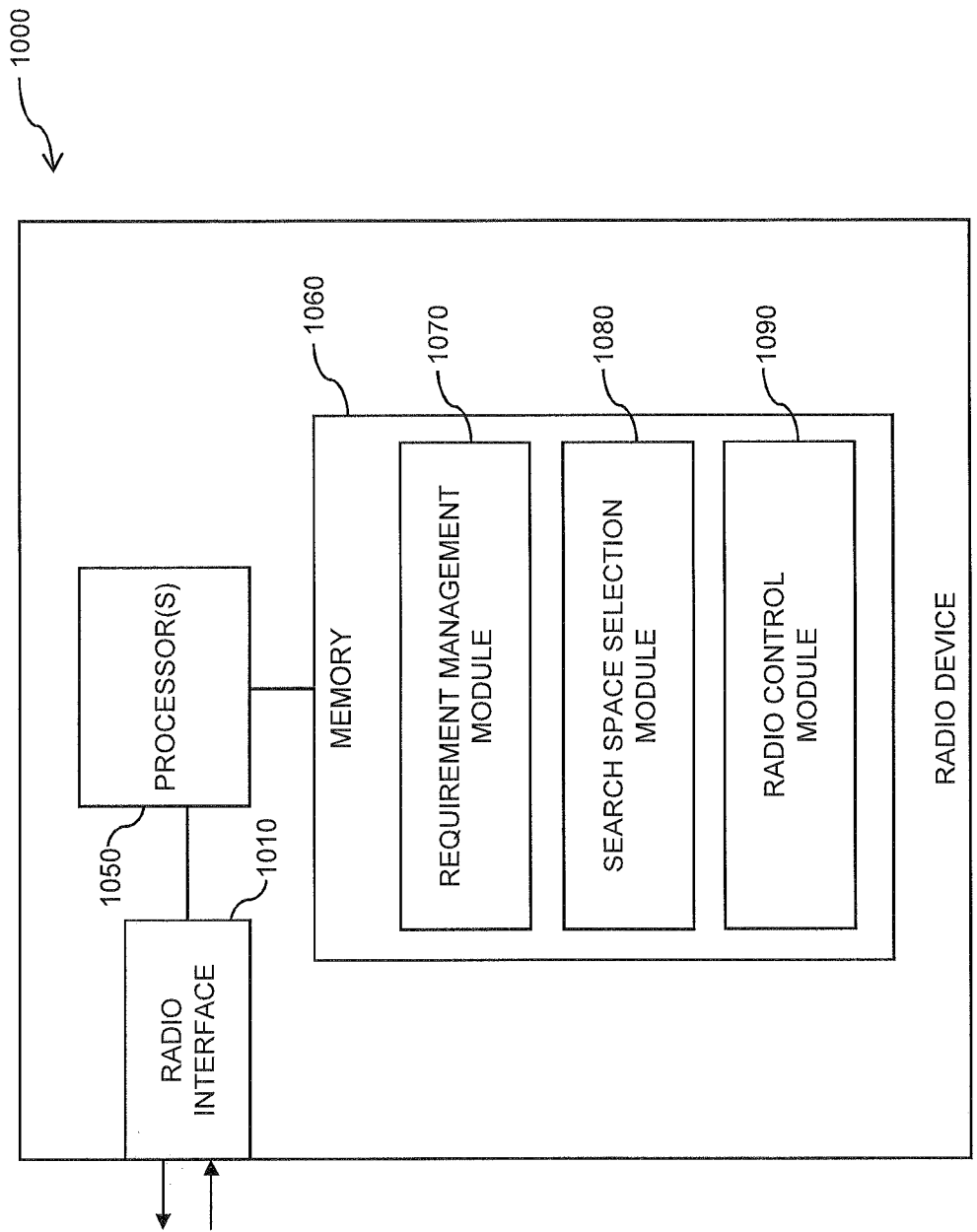
FIG. 10 schematically illustrates structures of a radio device according to an embodiment of the invention.

It is to be understood that the structures as illustrated in FIG. 9 are merely schematic and that the access node 900 may actually include further components which, for the sake of clarity, have not been illustrated, e.g., further interfaces or processors. Also, it is to be understood that the memory 960 may include further types of program code modules, which have not been illustrated, e.g., program code modules for implementing known functionalities of an access node, such as an eNB of the LTE radio technology. According to some embodiments, also a computer program may be provided for implementing functionalities of the access node 900, e.g., in the form of a physical medium storing the program code and/or other data to be stored in the memory 960 or by making the program code available for download or by streaming. FIG. 10 illustrates exemplary structures which may be used for implementing the above concepts in a radio device 100, such as one of the radio devices 10. The radio device 1000 may for example correspond to a mobile phone or to some other type of portable or stationary computing device. Further, the radio device thousand may also correspond to an MTC device, e.g., an autonomous sensor or actuator.

As illustrated, the radio device 1000 may include a radio interface 1010 for connecting the radio device 1000 to the wireless communication network. Further, the radio device 1000 may include one or more processors 1050 coupled to the interface 1010, and a memory 1060 coupled to the processor(s) 1050. The memory 1060 may include a ROM, e.g., a flash ROM, a RAM, e.g., a DRAM or SRAM, a mass storage, e.g., a hard disk or solid state disk, or the like. The memory 1060 includes suitably configured program code to be executed by the processor(s) 1050 so as to implement the above-described functionalities of a radio device. In particular, the memory 1060 may include various program code modules for causing the radio device 1000 to perform processes as described above, e.g., corresponding to the method steps of FIG. 7.

As illustrated, the memory 1060 may include a requirement management module 1070 for implementing the above-described functionalities of determining one or more timing requirements of the radio device, such as explained in connection with step 710 of FIG. 7. Further, the memory 1060 may include a search space management module 1080 for implementing the above-described functionalities of selecting one or more search space configurations, such as explained in connection with step 720 of FIG. 7. Further, the memory 1060 may also include a radio control module 1090 for implementing the above-described functionalities of receiving downlink control information, such as explained in connection with step 730 of FIG. 7.

It is to be understood that the structures as illustrated in FIG. 10 are merely schematic and that the radio device 1000 may actually include further components which, for the sake of clarity, have not been illustrated, e.g., further interfaces or processors. Also, it is to be understood that the memory 1060 may include further types of program code modules, which have not been illustrated, e.g., program code modules for implementing known functionalities of a UE as specified for the LTE radio technology. According to some embodiments, also a computer program may be provided for implementing functionalities of the radio device 1000, e.g., in the form of a physical medium storing the program code and/or other data to be stored in the memory 1060 or by making the program code available for download or by streaming.

As can be seen, the concepts as described above may be used for efficiently controlling radio transmissions in a wireless communication network. In particular, the concepts may be applied for considering coexistence of radio devices and/or applications which are subject to different timing requirements.

It is to be understood that the examples and embodiments as explained above are merely illustrative and susceptible to various modifications. For example, the illustrated concepts may be applied in connection with various radio technologies, without limitation to the above-mentioned example of a the LTE radio technology or a 5G radio technology. Further, the illustrated concepts may be applied in connection with various kinds of access nodes and radio devices. Further, the concepts may be applied with respect to any number of different timing requirements and corresponding search space configurations. Moreover, it is to be understood that the above concepts may be implemented by using correspondingly designed software to be executed by one or more processors of an existing device, or by using dedicated device hardware. Further, it should be noted that the illustrated nodes may each be implemented as a single device or as a system of multiple interacting devices.

The invention claimed is:

1. A method of controlling radio transmission in a wireless communication network, the method comprising:
    an access node of the wireless communication network determining a configuration of a first search space in terms of first time domain coordinates and first frequency domain coordinates of a time-frequency grid of radio resource elements;
    the access node determining a configuration of a second search space in terms of second time coordinates and second frequency domain coordinates of the time frequency grid, the second search space differing from the first search space at least with respect to the time domain coordinates;
    the access node determining a number of radio devices of the first class in a coverage region of the access node;
    the access node determining the configuration of at least one of the first search space and the second search space depending on the determined number of radio devices of the first class;
    the access node transmitting, in radio resource elements of the first search space, downlink control information for a first class of radio devices subject to a first timing requirement; and
    the access node transmitting, in radio resource elements of the second search space, downlink control information for a second class of radio devices subject to a second timing requirement which is stricter than the first timing requirement.

2. The method of claim 1, wherein the second search space has a shorter time duration than the first search space.

3. The method of claim 1, wherein the second search space has an earlier start time than the first search space.

4. The method of claim 1, wherein the second search space extends over a larger frequency range than the first search space.

5. The method of claim 1:
    wherein the first search space is configured according to a periodic pattern defined by a first time period; and
    wherein the second search space is configured according to a periodic pattern defined by a second time period which is shorter than the first time period.

6. The method of claim 1:
    wherein the determined configuration of the first search space defines a first set of radio resource elements of the time-frequency grid which are assigned to transmission of reference signals; and
    wherein the determined configuration of the second search space defines a second set of radio resource elements of the time-frequency grid which are assigned to transmission of reference signals, the second set of radio resource elements being different from the first set of resource elements.

7. The method of claim 1, further comprising:
    the access node determining a number of radio devices of the second class in a coverage region of the access node; and
    the access node determining the configuration of at least one of the first search space and the second search space depending on the determined number of radio devices of the second class.

8. The method of claim 1, further comprising:
    the access node determining a traffic load associated with radio devices of the first class in a coverage region of the access node; and
    the access node determining the configuration of at least one of the first search space and the second search space depending on the determined traffic load associated with the radio devices of the first class.

9. The method of claim 1, further comprising:
    the access node determining a traffic load associated with radio devices of the second class in a coverage region of the access node; and
    the access node determining the configuration of at least one of the first search space and the second search space depending on the determined traffic load associated with the radio devices of the second class.

10. The method of claim 1, further comprising the access node indicating at least one of the determined configuration of the first search space and the determined configuration of the second search space to one or more radio devices in a coverage region of the access node.

11. A method of controlling radio transmission in a wireless communication network, the method comprising:
    depending on a timing requirement for a radio device, the radio device selecting at least one of a first search space configuration and a second search space configuration;
    an access node determining a number of radio devices of the first class in a coverage region of the access node; and
    the access node determining the configuration of at least one of the first search space and the second search space depending on the determined number of radio devices of the first class;
    wherein:
    the first search space configuration defines a first search space in terms of first time domain coordinates and first frequency domain coordinates of a time-frequency grid of radio resource elements; and
    the second search space configuration defines a second search space in terms of second time coordinates and second frequency domain coordinates of the time frequency grid, the second search space differing from the first search space at least with respect to the time domain coordinates;

if the first search space configuration is selected, the radio device receiving downlink control information in radio resource elements of the first search space; and if the second search space configuration is selected, the radio device receiving downlink control information in radio resource elements of the second search space.

12. The method of claim 11, wherein the second search space has a shorter time duration than the first search space and/or an earlier start time than the first search space.

13. The method of claim 11, wherein the second search space extends over a larger frequency range than the first search space.

14. The method of claim 11:
wherein the first search space is configured according to a periodic pattern defined by a first time period; and
wherein the second search space is configured according to a periodic pattern defined by a second time period which is shorter than the first time period.

15. The method of claim 11:
wherein the first search space configuration defines a first set of radio resource elements of the time-frequency grid which are assigned to transmission of reference signals, and
wherein the second search space configuration defines a second set of radio resource elements of the time-frequency grid which are assigned to transmission of reference signals, the second set of radio resource elements being different from the first set of resource elements.

16. The method of claim 11, further comprising:
depending on a first timing requirement for a first application configured on the radio device, the radio device selecting the first search space configuration; and
depending on a second timing requirement for a second application configured on the radio device, the radio device selecting the second search space configuration.

17. The method of claim 11, further comprising the radio device receiving an indication of at least one of the first search space configuration and of the second search space configuration from an access node of the wireless communication network.

18. An access node for a wireless communication network, the access comprising:
processing circuitry;
memory containing instructions executable by the processing circuitry whereby the access node is operative to:
determine a configuration of a first search space in terms of first time domain coordinates and first frequency domain coordinates of a time-frequency grid of radio resource elements;
determine a configuration of a second search space in terms of second time coordinates and second frequency domain coordinates of the time frequency grid, the second search space differing from the first search space at least with respect to the time domain coordinates;
determine a number of radio devices of the first class in a coverage region of the access node;
determine the configuration of at least one of the first search space and the second search space depending on the determined number of radio devices of the first class;
in radio resource elements of the first search space, transmit downlink control information for a first class of radio devices subject to a first timing requirement; and
in radio resource elements of the second search space, transmit downlink control information for a second class of radio devices subject to a second timing requirement which is stricter than the first timing requirement.

* * * * *